United States Patent [19]

Lugscheider et al.

[11] Patent Number: 4,940,487
[45] Date of Patent: Jul. 10, 1990

[54] PROCESS FOR UTILIZING OF ZINC-CONTAINING METALLURGICAL DUSTS AND SLUDGES

[75] Inventors: Walter Lugscheider, Graz; Luzian Pochmarski, Leoben, both of Austria

[73] Assignee: Voest-Alpine Stahl Donawitz Gesellschaft m.b.H., Leoben-Donawitz, Austria

[21] Appl. No.: 333,232

[22] Filed: Apr. 5, 1989

[30] Foreign Application Priority Data

Apr. 8, 1988 [AT] Austria ................................. 925/88

[51] Int. Cl.$^5$ ............................................. C22B 7/02
[52] U.S. Cl. ......................................... 75/384; 75/961
[58] Field of Search .................... 75/25, 88, 43, 44 S

[56] References Cited

U.S. PATENT DOCUMENTS

| 4,372,780 | 2/1983 | Madelin ................... 75/25 |
| 4,758,268 | 7/1988 | Bishop et al. .............. 75/25 |

FOREIGN PATENT DOCUMENTS

| 376241 | 10/1984 | Austria . |
| 2740675 | 1/1979 | Fed. Rep. of Germany . |
| 252617 | 12/1987 | German Democratic Rep. . |

*Primary Examiner*—Melvyn J. Andrews
*Attorney, Agent, or Firm*—Cushman, Darby & Cushman

[57] ABSTRACT

In a process for utiliting zinc-containing metallurgical dusts and sludges, the zinc-containing dusts and sludges are agglomerated, briquetted in a cold manner or pelletized and are added to the charge of a melting furnace for melting metal from metallized charges such as, scrap iron or pig iron. For this purpose, there are in particular used agglomerates or pellets having a metallizing degree of at least 30 percent by weight, preferably of at least 40 percent by weight.

11 Claims, No Drawings

PROCESS FOR UTILIZING OF ZINC-CONTAINING METALLURGICAL DUSTS AND SLUDGES

BACKGROUND OF THE INVENTION

1. Field of the Invention

The invention refers to a process for utilizing of zinc-containing metallurgical dusts and sludges.

2. Description of the Prior Art

The utilization of zinc-containing metallurgical dusts and sludges by using same as secondary raw materials in zinc smelters is not economic in case where zinc contents of these dusts and sludge are below 20 percent by weight. The lack of economy results, on the one hand, from the high costs of hydro-metallurgical processes with subsequent electrolysis and, on the other hand, from the fact that there result great amounts of residual sludges having a high iron content. An economic utilization of such zinc wastes is, at present, possible by means of rotary kiln processes in case of zinc contents of approximately 30 percent by weight.

The utilization of metallurgical dusts and sludges having a low zinc content within the range of 0.1 to 10 percent by weight is presently effected by charging these materials in electric arc furnaces. The enrichment in zinc is effected within the waste gas filters up to a zinc concentration of about 20 percent by weight. When using zinc-containing dusts in converters, there were already made considerations for carrying on the so-called zinc spiral, i.e. the circuit between evaporation and condensation of the zinc within the interior of the converter, to such a degree that it becomes possible to obtain dusts having a zinc content of approximately 20 percent by weight. Such a procedure suffers, however, from the metallurgical drawback that the zinc content within the steel is increased on account of the high reaction temperature, so that, as a whole, the economy is insufficient in case of a utilization in zinc smelters.

SUMMARY OF THE INVENTION

The invention now aims at providing a process for the utilization of zinc-containing metallurgical dusts and sludges which is simple and favourable with respect to cost and which allows one to utilize mixed sludges derived from the blast furnace, the furnace throat and the LD-process as well as dusts derived from the furnace throat, the blast furnace and converters in course of the dry dust separation. For solving this task, the process according to the invention essentially consists in that the zinc-containing metallurgical dusts and sludges are agglomerated, briquetted in a cold manner or pelletized with a carbon carrier, in that the agglomerates (i.e. the briquettes or pellets are utilized which have a metallizing degree (i.e. a total metal content of iron, zinc and any other metals present) of at least 30 percent by weight, preferably of at least 40 percent by weight, and in that during the production of the pellets a carbon content of at least 20 to 25 percent is adjusted by the addition of carbon carriers and the agglomerates are added to the charge of a melting furnace for melting metal from metallized charges such as, for example, scrap iron or pig iron. By agglomerating, in particular pelletizing, the dusts, optionally by adding sludges, there can, in this manner, be derived from the melting process dust materials having a zinc content of 40 to 50 percent by weight, and this in particular if the melting process is performed according to the so-called KVA-process. The so-called KVA-process is an alumino-thermic converter process in which scrap is molten together with coal and additives in a suitable melting crucible by means of natural gas or liquid fuels and oxygen. On account of the reducing conditions for the zinc-containing charged materials in a melting furnace, in particular under the conditions of the KVA-process, there can be obtained high metallizing degrees. Further enrichment of zinc in the produced metallurgical dusts ca be obtained by using galvanized types of scrap iron in such a melting furnace in which metal is molten from metallized charging materials. The briquetting step must at any rate be performed as a cold briquetting step, noting that, however, a pelletizing step is performed for avoiding any additional dust removal. Any amount of zinc produced from metallizing charges in the reducing atmosphere of the melting furnace for melting metal is accepted by the dust, whereas the oxide would enter the slag and be lost. The proportion of zinc oxide in the slag results in the initially indicated problems, including the possible need for a special waste disposal area and the costs therefor. The zinc accepted by the dust increases, in the form of metallic zinc, the yield in zinc, and it is possible to further improve the yield in iron, considering the substantial utilization of iron already effected by metallizing in the dry dust removal steps, if a complete reduction of non-metallized portions of the metallurgical dusts is obtained by adding carbon carriers, preferably sludges of the furnace throat and of the blast furnace as the carbon carrier. The non-reduced proportions, if any, i.e. the oxidic iron proportions as well as proportions of zinc oxide having possibly entered the slag, may, after a comminuting step and a magnetic separating step, again be utilized via the converter process, so that there results, as a whole, a nearly 100 percent utilization of the zinc content as well as of the iron content of the metallurgical wastes, dusts and sludges, accompanied by extremely low costs. The agglomerates or pellets to be used within the scope of the process according to the invention are used with a metallizing degree of at least 30 percent by weight, preferably at least 40 percent by weight. Such a high metallizing degree can reliably be obtained by adjusting a carbon content of 20 to 25 percent by weight by adding carbon carriers when producing the pellets.

While briquetting is requiring relatively high technical plant investments, pelletizing can be performed in a relatively simple way and by thereby obtaining pellets having a good strength. Advantageously, a binding agent such as lime milk and/or lime is added for the purpose of increasing the strength of the pellets and thus for reducing any additional dust discharge. On account of such pellets, the additives simultaneously charged, as a rule, in the KVA-process can be used in a smaller amount, and, in particular, an optionally desired lime addition can be reduced for the same amount as has already been used for hardening and drying the pellets.

Within the scope of the process according to the invention, there are advantageously used agglomerates or pellets of the following composition:

20-25 percent by weight carbon carrier
5 percent by weight binding agent and
remainder metallurgical dust containing ZnO and $Fe_2O_3$ and/or PbO and/or MgO and/or $SiO_2$ and/or CaO.

When using pellets containing such binding agents and carbon carriers, there can reliably be obtained a high degree of metallization of the zinc contained in the dusts, and it is possible to discharge the zinc in the desired manner together with the dust of the melting process, noting that the proportion of zinc being present in the slag as zinc oxide can be lowered to a minimum amount.

It is within the scope of the process according to the invention to perform, in particular with consideration of the KVA-process being performed by supplying the heat required for melting molten iron from scrap iron by means of burners within the interior of the furnace, the process advantageously such that agglomerates, briquettes or pellets are added to the metallic charge in an amount of 2 to 8 percent by weight, preferably 5 percent by weight. Thus, it is possible to process relatively high proportions of metallurgical dusts or, respectively, metallurgical sludges without affecting the melting process. It is simultaneously made sure that the proportion of zinc contained in the zinc-containing dusts enters the KVA-dust as metallized zinc and does not enter the slag.

What is claimed:

1. A process for utilizing a zinc-containing by-product comprising at least one of zinc-containing metallurgical dust and zinc-containing metallurgical sludge derived from a steel-making process and containing at least 30 percent total metallic constituents by weight, essentially including iron and zinc,
said process comprising:
    (a) providing a converter adapted to accept a charge of metallic material, apply heat such as to melt at least some of said charge by combustion of a fuel, and thereby produce as an output molten metal, slag and a metallurgical dust, in a melting process;
    (b) charging said converter with an iron-containing metallized charge;
    (c) accepting a supply of said zinc-containing by-product;
    (d) analyzing the accepted zinc-containing by-product for carbon content and, if said carbon content lies outside the range of 20 to 25 percent by weight, adjusting said carbon content to lie within said range;
    (e) agglomerating said zinc-containing by-product into agglomerates which are constituted by at least one of briquettes and pellets;
    (f) further charging said converter with said agglomerates in an amount of 2 to 8 percent by weight of said iron-containing metallized charge; and
    (g) conducting said melting process in said converter and thereby obtaining in said metallurgical dust from said converter a constant rich in metallic zinc.

2. The process of claim 1, wherein:
said iron-containing metallic charge is constituted by at least one of scrap iron, pig iron and galvanized scrap iron.

3. The process of claim 1, wherein:
said zinc-containing by-product is constituted by at least one of blast furnace sludge, blast furnace throat sludge, LD-process sludge, blast furnace throat dust, blast furnace dry dust separator dust, and converter dry dust separator dust.

4. The process of claim 1, wherein:
said carbon content of said zinc-containing by-product is raised in step (b) by adding carbon carrier thereto.

5. The process of claim 1, wherein:
said zinc-containing by-product is agglomerated by briquetting.

6. The process of claim 1, wherein:
said zinc-containing by-product is agglomerated by pelletizing.

7. The process of claim 6, wherein:
prior to pelletizing, a binding agent constituted by at least one of lime milk and lime is added to said zinc-containing by-product.

8. The process of claim 1, wherein:
said metallurgical dust produced in step (g) contains at least 40 percent metallic zinc, by weight.

9. The process of claim 1, wherein:
said melting process is conducted as a KVA-process.

10. The process of claim 1, wherein:
said zinc-containing by-product contains ZnO, $Fe_2O_3$ and at least one of PbO, MgO, $SiO_2$ and CaO.

11. The process of claim 1, wherein:
said carbon carrier is constituted by at least one of furnace throat sludge and blast furnace sludge.

* * * * *